US006637816B2

(12) United States Patent
Pavlov et al.

(10) Patent No.: US 6,637,816 B2
(45) Date of Patent: Oct. 28, 2003

(54) SEATING SYSTEM FOR A VEHICLE HAVING A DECELERATION SENSOR

(75) Inventors: Kevin J. Pavlov, Livonia, MI (US); Pahngroc Oh, Ann Arbor, MI (US); Stephen M. Stachowski, Canton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/094,830

(22) Filed: Mar. 11, 2002

(65) Prior Publication Data

US 2002/0125750 A1 Sep. 12, 2002

Related U.S. Application Data

(60) Provisional application No. 60/274,882, filed on Mar. 9, 2001.

(51) Int. Cl.[7] ................................. B60N 2/42
(52) U.S. Cl. .................. 297/216.2; 297/216.1; 297/216.16; 297/216.19
(58) Field of Search .................. 297/216.2, 216.19, 297/219.16, 216.1; 248/396

(56) References Cited

U.S. PATENT DOCUMENTS

| 3,452,834 A | * | 7/1969 | Gaut ........................... 180/268 |
| 3,577,659 A | * | 5/1971 | Kail ............................. 434/58 |
| 4,074,886 A | * | 2/1978 | Yates .......................... 248/394 |
| 4,154,472 A | * | 5/1979 | Bryll .......................... 296/68.1 |
| 4,722,550 A | | 2/1988 | Imaoka et al. |
| 4,781,414 A | * | 11/1988 | Periou ......................... 297/313 |
| 4,900,079 A | | 2/1990 | Obara et al. |
| 4,924,162 A | | 5/1990 | Sakamoto et al. |
| 5,130,622 A | | 7/1992 | Takizawa et al. |
| 5,263,765 A | | 11/1993 | Nagashima et al. |
| 5,320,409 A | | 6/1994 | Katoh et al. |
| 5,490,706 A | * | 2/1996 | Totani ......................... 296/68.1 |
| 5,556,160 A | * | 9/1996 | Mikami ...................... 297/216.1 |
| 5,567,006 A | | 10/1996 | McCarthy |
| 5,695,242 A | * | 12/1997 | Brantman et al. ........ 297/216.1 |
| 5,707,109 A | | 1/1998 | Massara et al. |
| 5,743,591 A | * | 4/1998 | Tame ......................... 297/216.1 |
| 5,975,508 A | | 11/1999 | Beard |
| 6,024,378 A | | 2/2000 | Fu |
| 6,037,731 A | | 3/2000 | Fruehauf et al. |
| 6,056,079 A | | 5/2000 | Cech et al. |
| 6,059,253 A | | 5/2000 | Koutsky et al. |
| 6,088,642 A | | 7/2000 | Finkelstein et al. |
| 6,120,082 A | | 9/2000 | Vandermolen |
| 6,122,568 A | | 9/2000 | Madau et al. |
| 6,182,783 B1 | * | 2/2001 | Bayley ........................ 180/271 |
| 6,193,297 B1 | * | 2/2001 | Vandermolen ............... 180/282 |

FOREIGN PATENT DOCUMENTS

JP        63 315342        12/1988

OTHER PUBLICATIONS

PCT Publication WO 00/12350, Mar. 9, 2000.

* cited by examiner

Primary Examiner—Peter M. Cuomo
Assistant Examiner—Sarah C. Burnham
(74) Attorney, Agent, or Firm—Brinks Hofer Gilson & Lione

(57) ABSTRACT

The seating system of the preferred embodiment of the invention has been specifically designed for a vehicle having a deceleration sensor adapted to sense a deceleration event of the vehicle. The seating system of this preferred embodiment includes a seat assembly, a tilting mechanism adapted to tilt the seat assembly, and a control unit coupled to the deceleration sensor and adapted to activate the tilting mechanism upon the sensing of a deceleration event.

3 Claims, 3 Drawing Sheets

SEATING SYSTEM FOR A VEHICLE HAVING A DECELERATION SENSOR

CROSS-REFERENCE TO RELATED APPLICATIONS

The present invention claims priority to U.S. Provision patent application Ser. No. 60/274,882 entitled "Electronic Occupant Position and Motion Sensing and Control" and filed on Mar. 9, 2001, which is incorporated in its entirety by this reference.

TECHNICAL FIELD

The present invention generally relates to a seating system for a vehicle having a deceleration sensor and to a method of tilting a seat assembly of a vehicle upon the sensing of a deceleration event.

BACKGROUND

In a sudden deceleration event of a vehicle, objects unfastened to the vehicle, including an occupant of a seat assembly within the vehicle, often experience a forward acceleration relative to the seat assembly and to the vehicle. In an attempt to cushion this occupant from the rigid interior of the vehicle, vehicle manufacturers have equipped cars with safety belt systems (also known as "seat belts") and, more recently, inflatable restraint systems (also known as "airbags"). While these systems are effective, there is a continual search for alternative and complimentary technologies in the area of vehicle safety.

DETAILED DESCRIPTION OF THE PREFERRED EMBODIMENT

The following description of the preferred embodiment of the invention is not intended to limit the invention to this embodiment, but rather to enable a person skilled in the art of seating systems to make and use this invention.

Figure 1:
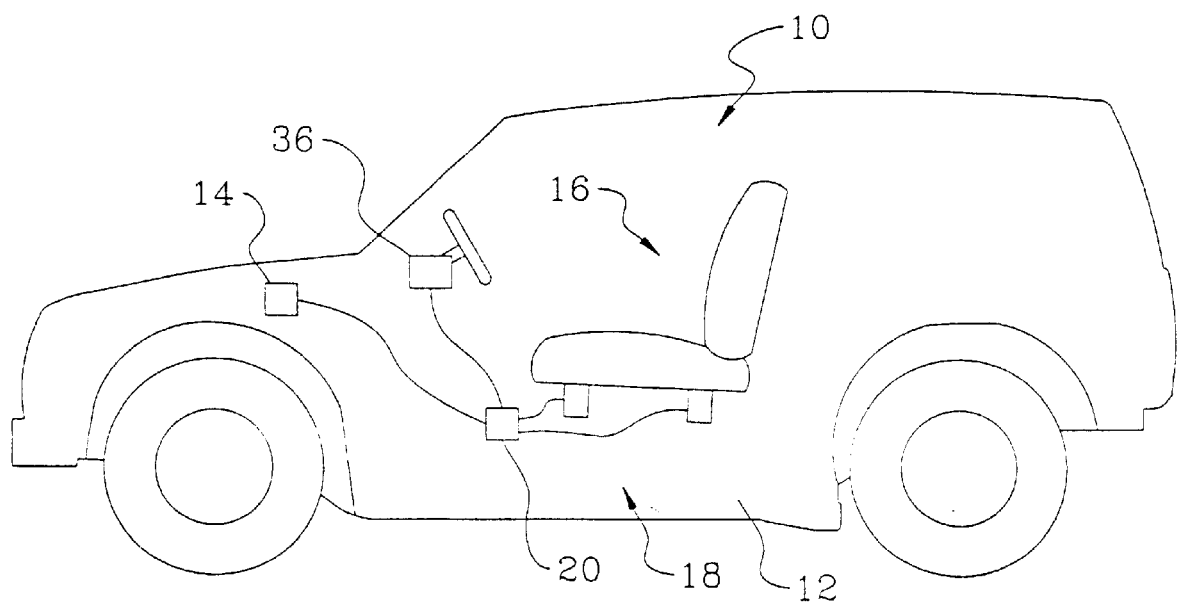
FIG. 1 is a schematic view of a vehicle with a seating system of the preferred embodiment of the invention.

As shown in FIG. 1, the seating system 10 of the preferred embodiment of the invention has been specifically designed for a vehicle 12 having a deceleration sensor 14 adapted to sense a deceleration event of the vehicle 12. The seating system 10 of this preferred embodiment includes a seat assembly 16, a tilting mechanism 18 adapted to tilt the seat assembly 16, and a control unit 20 coupled to the deceleration sensor 14 and adapted to activate the tilting mechanism 18 upon the sensing of a deceleration event. The seating system 10 of the preferred embodiment may also include other complimentary elements, such as the elements described below or envisioned by a skilled person in the art of seating systems. Furthermore, this and alternative embodiments of the invention may be used in other environments, such as personal aircraft and watercrafts, or other suitable environments, such as large-scale spacecrafts, aircrafts, watercrafts, or trains.

Figure 2:
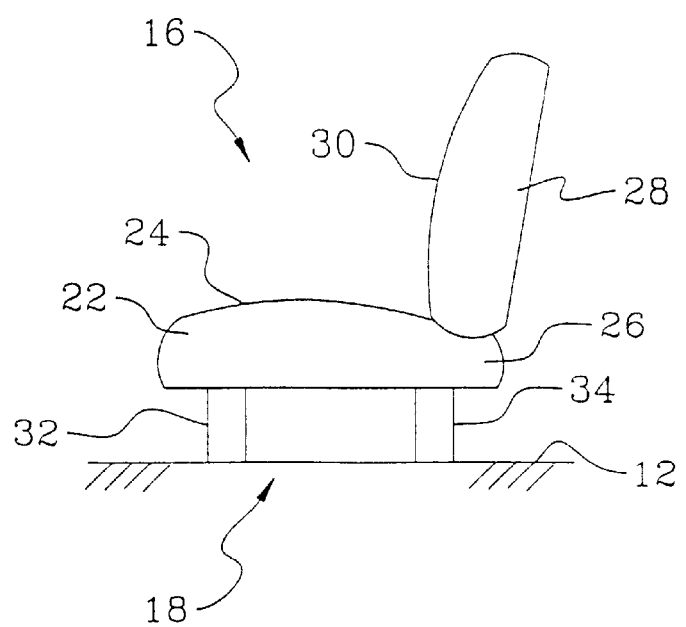
FIG. 2 is a side view of a seat assembly of the seating system of FIG. 1.

As shown in FIG. 2, the seat assembly 16 of the preferred embodiment includes a seat section 22 having a front portion 24 and a rear portion 26, and a back section 28 coupled to the rear portion 26 of the seat section 22. The seat assembly 16 functions to provide support and comfort to the occupant of the seat assembly 16. The seat assembly 16 of the preferred embodiment includes a conventional frame member (not shown), a convention foam layer (not shown), and a conventional trim layer 30. The seat section 22 of the seat assembly 16, in addition to providing support and comfort to the occupant, also aids in the deceleration of the occupant of the seat assembly 16 during a deceleration event of the vehicle 12. For this reason, the seat section 22 is preferably made with a resilient structure, such as the combination of the frame member, the foam layer, and the trim layer 30. The seat section 22 may, however, be made with other suitable resilient structures, such as plastics.

The tilting mechanism 18 of the preferred embodiment, which is fastenable to the vehicle 12 and coupled to the seat section 22 of the seat assembly 16, functions as a tilting means to tilt the seat assembly 16. More specifically, the tilting mechanism 18 is preferably adapted to displace the front portion 24 in an upward direction relative to the rear portion 26 to reposition the seat section 22 of the seat assembly 16 and aid in the deceleration of the occupant of the seat assembly 16.

Figure 3A:
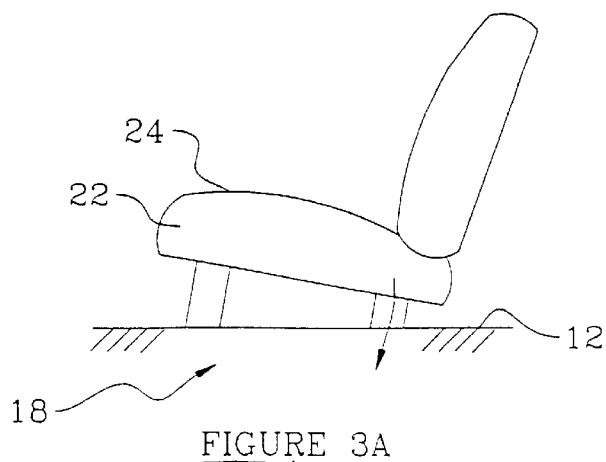
FIGS. 3A, 3B, and 3C illustrate the different methods of tilting the seat assembly of FIG. 2.
Figure 3B:
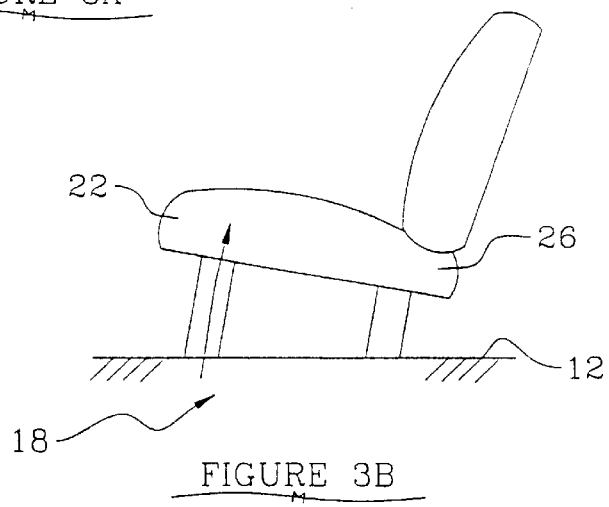
Figure 3C:
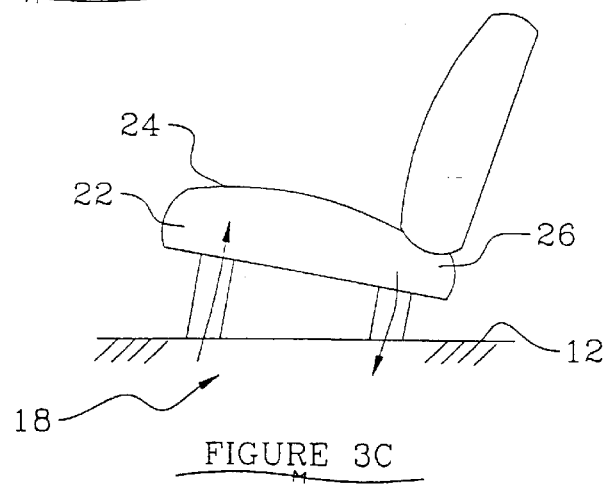

As shown in FIGS. 3A, 3B, and 3C, the positioning of the seat section 22 may be accomplished in at least three different methods: displacing the front portion 24 in an upward direction relative to the vehicle 12 (shown in FIG. 3B), displacing the rear portion 26 in a downward direction relative to the vehicle 12 (shown in FIG. 3A), and simultaneously displacing the front portion 24 in an upward direction and displacing the rear portion 26 in a downward direction relative to the vehicle 12 (shown in FIG. 3C). The tilting mechanism 18 can be activated to follow one of these methods in all situations, or to follow an appropriate method depending on the situation. As an example of the latter method, the tilting mechanism 18 may be combined with conventional comfort controls of a typical seat assembly. In this situation, if the rear portion 26 of the seat section 22 has already been positioned to the furthermost downward position prior to the deceleration event, then the front portion 24 of the seat section 22 must be displaced in an upward direction to tilt the seat assembly 16. Likewise, in this situation, if the front portion 24 of the seat section 22 has already been positioned to the furthermost upward position, then the rear portion 26 of the seat section 22 must be displaced in a downward direction.

As shown in FIG. 2, the tilting mechanism 18 of the preferred embodiment preferably includes a front actuator 32 coupled to the front portion 24 and a rear actuator 34 coupled to the rear portion 26. The front actuator 32 functions as a front displacing means to displace of the front portion 24 of the seat section 22, while the rear actuator 34 functions as a rear displacing means to displace the rear portion 26 of the seat section 22. The tilting mechanism 18 of alternative embodiments may only include the front actuator 32 or the rear actuator 34. In an embodiment with only the front actuator 32, the front actuator 32 would displace the front portion 24 in an upward direction to tilt the seat section 22. Similarly, in an embodiment with only the rear actuator 34, the rear actuator 34 would displace the rear portion 26 in a downward direction to tilt the seat section 22. The front actuator 32 and the rear actuator 34 are preferably hydraulic actuators, but other equivalent structures would include pneumatic, motor-solenoid, and electromagnetic.

Figure 4:
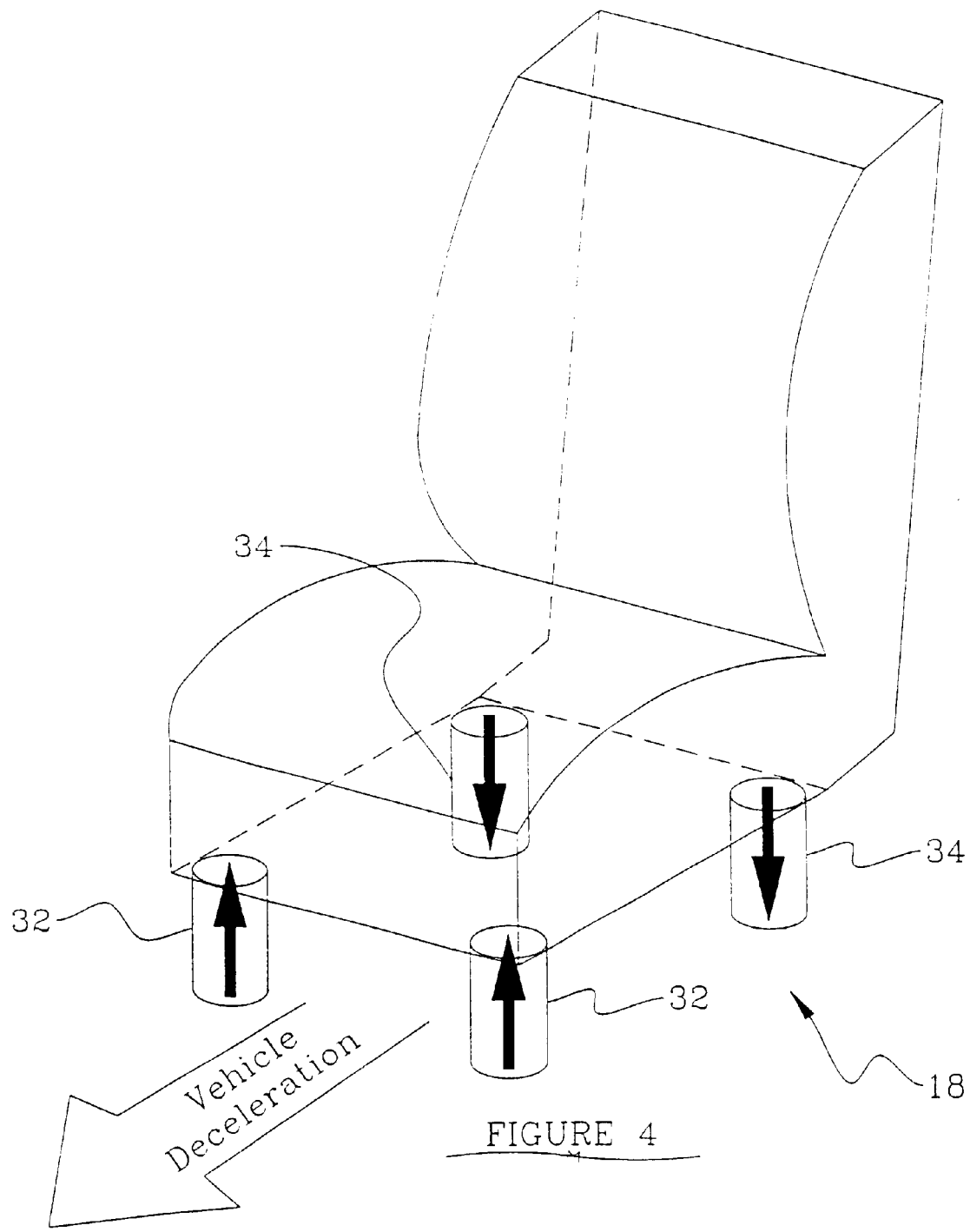
FIG. 4 is a perspective view of a seat assembly of an alternative embodiment of the invention.

The tilting mechanism 18 of alternative embodiments may include additional actuators to perform the same or additional functions. As shown in FIG. 4, the tilting mechanism 18 may include four actuators, two front actuators 32 at opposing sides of the front portion 24 and two rear actuators 34 at opposing sides of the rear portion 26. The two front actuators 32 may be activated in the same manner and the two rear actuators 34 may be activated in the same manner to displace the front portion 24 relative to the rear portion 26. The two front actuators 32 and the two rear actuators 34 may, however, be activated in dissimilar manners to provide side-to-side tilting of the vehicle 12, as described in a related international application No. PCT/US01/44503, entitled "Method For Tilting A Seat Of A Vehicle", filed on Nov. 27, 2001, assigned to Visteon Global Technologies, Inc., and incorporated in its entirety by this reference.

As shown in FIG. 1, the control unit 20 of the preferred embodiment, which is coupled to the deceleration sensor 14 of the vehicle 12, functions as a controlling means to activate the tilting mechanism 18 upon the sensing of a deceleration event. The control unit 20 may be programmed to activate the tilting mechanism 18 upon the sensing of every deceleration event or may be programmed with a deceleration threshold for the deceleration event. In the later version, the control unit 20 preferably activates the tilting mechanism 18 upon the sensing of a deceleration event with a magnitude greater than the deceleration threshold. Further, in either version, the control unit 20 may be programmed to also activate an inflatable restraint system 36, and/or another suitable system, upon the sensing of a sudden deceleration event.

The deceleration sensor 14 of the vehicle 12 may include a conventional brake sensor, an accelerometer, or other suitable device. Further, the deceleration sensor 14 may be a dedicated component for the seating system 10 or it may be a component shared with another system of the vehicle 12, such as a control unit for the inflatable restraint system 36.

As a person skilled in the art of seating systems will recognize from the previous detailed description and from the figures and claims, modifications and changes can be made to the preferred embodiments of the invention without departing from the scope of this invention defined in the following claims.

We claim:

1. A method of tilting a seat assembly of a vehicle having a seat section with a front portion and a rear portion and a tilting mechanism adapted to allow displacement of the front portion in an upward direction relative to the vehicle and to allow displacement of the rear portion in a downward direction relative to the vehicle, the method comprising the act of tilting the seat assembly upon the sensing of a deceleration event based on the following rules:

(a) if the rear portion of the seat section has not already been positioned to the furthermost downward position prior to the deceleration event and the front portion of the seat section has not already been positioned to the furthermost upward position, then simultaneously displacing the front portion in the upward direction relative to the vehicle and displacing the rear portion in the downward direction relative to the vehicle;

(b) if the rear portion of the seat section has already been positioned to the furthermost downward position prior to the deceleration event, then displacing the front portion in the upward direction relative to the vehicle; and (c) if the front portion of the seat section has already been positioned to the furthermost upward position, then displacing the rear portion in the downward direction relative to the vehicle.

2. The method of claim 1 further comprising the act of activating an inflatable restraint system upon the sensing of a deceleration event.

3. The method of claim 1 further including providing a deceleration threshold for the deceleration event, wherein said tilting act includes tilting the seat assembly upon the sensing of a deceleration event with a magnitude greater than the deceleration threshold.

\* \* \* \* \*